C. LE G. FORTESCUE.
PHASE BALANCING SYSTEM.
APPLICATION FILED MAY 7, 1917.

1,378,019.

Patented May 17, 1921.
4 SHEETS—SHEET 2.

Fig. 2.

INVENTOR
Charles LeG. Fortescue
BY
Wesley G. Carr
ATTORNEY

C. LE G. FORTESCUE.
PHASE BALANCING SYSTEM.
APPLICATION FILED MAY 7, 1917.

1,378,019.

Patented May 17, 1921.
4 SHEETS—SHEET 4.

WITNESSES:
Fred. A. Lind.
Geo. W. Hansen.

INVENTOR
Charles LeG. Fortescue
BY
Wesley G. Carr
ATTORNEY

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

PHASE-BALANCING SYSTEM.

1,378,019.   Specification of Letters Patent.   Patented May 17, 1921.

Application filed May 7, 1917. Serial No. 167,086.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Phase-Balancing Systems, of which the following is a specification.

My invention relates to electrical distributing systems and it has special relation to polyphase transmission systems embodying distributing circuits and phase balancing means for maintaining symmetrical polyphase conditions in the system, under all load conditions.

It has heretofore been the practice to select the loads on the several phases of a polyphase distributing system so as to prevent excessive unbalancing of the phase voltages and currents. Unless such care was exercised, the transmission system did not operate economically and its ultimate load capacity was considerably reduced. In unbalanced systems, polyphase apparatus, which is designed for balanced voltages and currents, is adversely affected when unbalanced conditions are imposed upon the system. For instance, high temperatures develop in portions of the polyphase translating devices unless the windings thereof are so liberally designed that unbalanced currents do not affect them. Again, emergency conditions frequently demand that two or more polyphase systems be connected together in order that electrical energy may be interchanged between them. But, it is objectionable and inefficient to do this when one of the power systems is considerably unbalanced because the unbalanced system will reflect its unbalanced conditions upon any satisfactorily balanced system that may be connected to it.

An object of my invention is to provide a phase balancing means comprising static reactive elements whereby equal divisions of the unbalanced loads may be automatically effected among the several phases of a polyphase system, irrespective of the loading of the several phases, the power factors of the polyphase load currents, and other asymmetrical conditions that may obtain therein.

Another object of my present invention is to provide a phase balancer of the above indicated character that will permit of conjointly controlling the power factors of the balanced polyphase currents in the phases of the distributing system, independently of the power factors of the unbalanced polyphase load currents that are required for the purpose of supplying the unbalanced loads.

By reason of this control of the power factors in the several phases of the distributing system, electrical energy may be efficiently transmitted although supplying power to both polyphase loads and single-phase loads of diverse characters.

For a better understanding of the characteristic features of my invention, reference may be had to the following description and the accompanying drawings in which.

In distributing systems of the present invention, I employ a combination of condensive and inductive reactance element which, for convenience, I will designate as a "bridge." This bridge comprises two groups of condensive elements and two groups of inductive elements, the groups of condensive elements alternating in position with the groups of inductive elements to form a closed circuit or square. Two oppositely disposed potential points, each being located between a group of condensive elements and a group of inductive elements, defines one diagonal of the square, and the other two opposite potential points, forming the other connections between the groups of inductive elements and condensive elements, defines the other diagonal of the square.

When employing the aforesaid bridge as a phase balancer, one phase of the polyphase system may be connected across one of the diagonals of the square and another phase of the polyphase system may be connected across the other diagonal. Through the intermediary of this bridge, therefore, at least two phases of the polyphase system are interconnected with each other in order to provide for the interchange of energy between them so that balanced polyphase conditions may be obtained in the polyphase system.

By placing a plurality of reactive elements in each arm of the bridge, means are available for varying the admittances of the several bridge arms. If the elements of the bridge are initially adjusted so that each arm possesses the same reactance and so that the voltage obtaining across one diagonal is equal to, and displaced 90° in phase from, the voltage obtaining across the other diagonal, the bridge may be considered as having a one-to-one voltage transformation.

The aforementioned arrangement of condensive and inductive elements, when employed in connection with polyphase circuits of a distributing system, as I contemplate in the present invention, possesses certain electrical characteristics, under certain conditions, which it will be well to enumerate.

When the bridge possesses a one-to-one voltage transformation and is connected to two phases of a polyphase system, as indicated above, the power components only of the polyphase currents obtaining in the polyphase circuits are automatically balanced so that equal power-component currents obtain in each phase. This transference of the power components currents only, between the several phases, is effected as long as the ratio between the admittance of the condensive arms and the admittance of the inductive arms is maintained constant. Although the wattless components of the polyphase currents are incapable of being balanced by this specific arrangement and the power factors of the polyphase currents are not subject to control, it will be understood that, by proportionately varying the admittances of the bridge arms, balanced conditions between the power components of the polyphase currents may be established.

Equal component wattless polyphase currents may be supplied to the polyphase system by varying the ratio between the condensive admittance and the inductive admittance of the bridge. Leading wattless polyphase currents of equal value will obtain in the polyphase circuits if the condensive admittance of the bridge exceeds the inductive admittance of the bridge and equal lagging wattless polyphase currents will obtain in the polyphase circuits if the inductive admittance of the bridge exceeds the condensive admittance of the bridge. This property of the bridge may be employed for controlling the power factors of the polyphase currents after balanced conditions have been restored in the polyphase circuits by any suitable means. For instance, assume that balanced polyphase lagging currents obtain in the polyphase circuits of the distributing system. By increasing the condensive admittance of the bridge which, of course, necessitates that the ratio between the admittances of the condensive arms and the admittances of the inductive arms be varied, balanced leading currents of any value, within limits, of course, may obtain in the polyphase circuits, thereby counteracting, to any desired degree, the effect of the aforementioned balanced polyphase lagging currents.

When the bridge is employed for balancing the power components of the polyphase currents and for supplying balanced wattless polyphase currents, either leading or lagging, to the polyphase circuits, the voltage transformation of the bridge remains unity and the two aforementioned results are obtained, in the first instance, by varying the admittances of the bridge arms while maintaining their ratios constant and, in the second instance, by varying the ratio between the condensive admittance and the inductive admittance of the bridge.

By varying the ratio of transformation of the bridge, the wattless components of the unbalanced polyphase currents may be balanced in the same manner as the power components of the polyphase currents. It is, therefore, apparent that if means are provided for varying the voltages obtaining across the two diagonals of the bridge, or for securing the electrical equivalent thereof, the wattless component polyphase currents may be balanced as well as the power component polyphase currents obtaining in the polyphase circuits. In consequence thereof, the bridge may serve as a phase balancer to maintain balanced polyphase conditions in the several phases of a polyphase system. If, in addition to proportionately varying the admittances of the bridge arms and the voltages impressed by the diagonals of the bridge upon the polyphase circuits, means are provided for varying the ratio between the condensive and inductive admittances of the bridge, the power factors obtaining in the polyphase circuits may be likewise controlled, under all load conditions.

By reason of the aforementioned electrical characteristics possessed by a bridge of the character indicated above, the device, therefore, may be adapted for phase balancing purposes.

Figure 1:
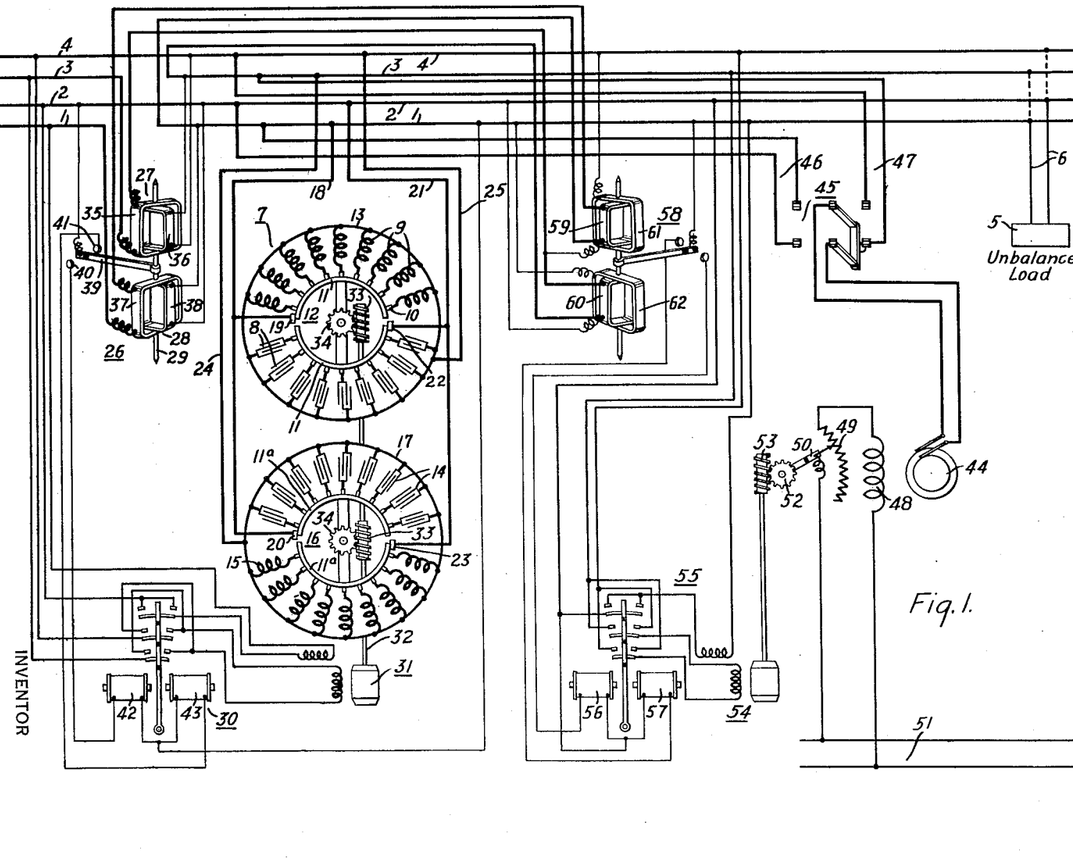
Figure 1 is a diagrammatic view of an alternating current distributing system embodying one form of my invention.

Referring to the system of Fig. 1, mains 1 and 2 comprise one phase and mains 3 and 4 comprise another phase of a polyphase distributing system. The unbalanced load obtaining in the system may be represented by a single apparatus 5 which may be connected, at will, through mains 6 to either phase 1—2 or phase 3—4. Irrespective of the character and amount of the unbalanced load 5, a phase balancer 7 provides means whereby equal divisions of the unbalanced load 5 may be effected among the phases of the polyphase system.

The phase balancing means 7 comprises a group of parallel connected condensive elements 8 and a group of parallel connected inductive elements 9 that, in this instance, severally possess the same reactance as each of the condensive elements 8. Corresponding terminals of the elements 8 and 9 are severally provided with brushes 10 that are adapted to slidingly engage conducting segments 11 mounted on a control drum 12. The other terminals of the elements 8 and 9 are connected to a common conductor 13. A second group of condensive elements 14 and a second group of inductive elements 15, which are similar in all respects to the aforementioned elements 8 and 9, respectively, are associated in a like manner with a second control drum 16. Corresponding terminals of the elements 14 and 15 are connected to a common conductor 17.

A conductor 18 extends from main 1 and is connected to a brush 19 that is adapted to engage the conducting segments 11 mounted on the control drum 12 and a brush 20 that is adapted to engage conducting segments 11ª mounted on the control drum 16. The main 2 is connected by means of a conductor 21 to a brush 22 that is adapted to engage the conducting segments 11 mounted on the control drum 12 and to a brush 23 that is adapted to engage the conducting segments 11ª mounted on the control drum 16. The main 3 is connected by means of a conductor 24 to the common conductor 17 that, in turn, is connected to the static elements 14 and 15 associated with the control drum 16 and the main 4 is connected by means of a conductor 25 to the common conductor 13 that, in turn, is connected to the static elements 8 and 9 associated with the control drum 12.

Figures 5, 7:
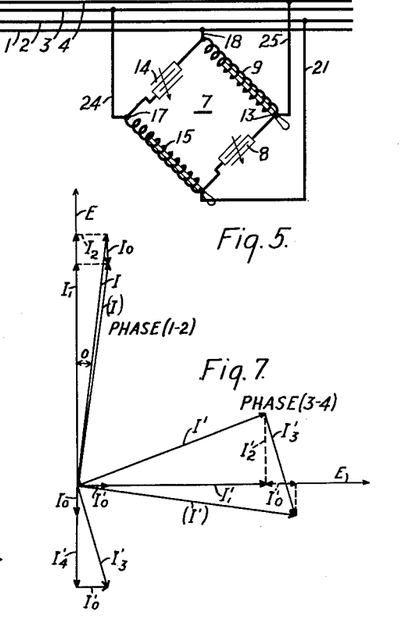
Fig. 5 is a simplified form of a portion of the phase balancing means embodied in the systems of Figs. 1 and 2.
Figs. 6 and 7 are vector diagrams illustrating the electrical conditions obtaining in the system of Fig. 1, under different load distributions in the polyphase circuits.

Fig. 5 illustrates, in a simplified form, the manner of connecting the bridge or phase balancing device 7 to the polyphase mains. In this instance, however, the groups of condensive elements 8 and 14 are severally represented by the single condensers 8 and 14, respectively, and the groups of inductive elements 9 and 15 are severally represented by the single inductive elements 9 and 15, respectively.

In the system of Fig. 1, a differential polyphase wattmeter relay 26 comprising an upper wattmeter element 27 and a lower wattmeter element 28, that are mounted upon a common shaft 29, controls the excitation of an electromagnetic reversing switch 30 which, in turn, controls the direction of rotation of a polyphase alternating current motor 31. Upon a shaft 32 of the motor 31 are mounted two worm mechanisms 33 that severally engage wheels 34. The worm and wheel mechanisms 33 and 34 are employed for rotating the control drums 12 and 16.

When the control drums are in their initial positions, as shown, the condensive elements of each group are connected to the same conducting segment on each drum and likewise the inductive elements of each group are connected to the same conducting segment on each drum. As a consequence, the admittances of the bridge arms are at their maximum values. In this particular instance, the condensive elements may be considered as severally possessing the same capacity reactance and the inductive elements as severally possessing the same inductive reactance. The inductive elements and the condensive elements are, therefore, capable of being severally connected either in the condensive arms or the inductive arms of the bridge depending upon the positions of the control drums 12 and 16.

When the drums are rotated in a clockwise direction, those conducting segments normally in contact with all of the condensive elements are disengaged from some of the condensive elements and brought into contact with some of the inductive elements. The condensive admittance of the bridge is thus decreased, since some of the inductive elements, being connected in parallel with some of the condensive elements, serve to increase the reactance offered by the condensive arms of the bridge. At the same time, the conducting segments normally in contact with all of the inductive elements are disengaged from some of the inductive elements and brought into contact with some of the condensive elements. The inductive admittance of the bridge is also decreased, since some of the condensive elements, being connected in parallel with some inductive elements, serve to increase the reactance offered by inductive arms of the bridge. It is apparent that by rotating the drums in a counter-clockwise direction to their initial positions, the condensive admittance of the bridge is increased and likewise the inductive admittance of the bridge is increased.

Since I have assumed that the reactance offered by each condensive element is equal to that offered by each inductive element, the admittances of the bridge arms may be varied while the ratio between the condensive admittance and the inductive admittance of the bridge is maintained constant. The motor 31, therefore, regulates the admittances of the several arms comprising the polyphase balancing device 7.

The differential wattmeter relay 26 comprises a current coil 35 of the upper wattmeter element 27 connected in series circuit with the main 3 and a voltage coil 36 which is connected across the phase 3—4. In a similar manner, a current coil 37 of the lower wattmeter element 28 is connected in series circuit with the main 1, and a voltage coil 38 is connected across the phase 1—2. A rotatable contact-making arm 39 is mounted upon the shaft 29 and is adapted to engage either a contact member 40 or a contact member 41, depending upon whether the upper wattmeter element 27 or the lower wattmeter element 28 exerts the predominating torque.

Electromagnets 42 and 43 of the reversing switch 30 are selectively excited through circuits established by the contact-making arm 39 when it engages either the contact member 40 or the contact member 41 of the relay 26. The reversing switch 30, which is of a usual form of construction, controls the direction of rotation of the polyphase induction motor 31. The differential wattmeter relay 26, therefore, adjusts the admittances of the condensive and inductive arms of the bridge 7, while maintaining the ratio between them constant, through the intermediary of the reversing switch 30 and the alternating current motor 31. This automatic adjustment continues until the differential wattmeter relay 26 resumes its neutral position, thereby indicating that equal power component currents obtain in the several phases of the polyphase system. Since power component currents in the two phases conjointly affect the differential wattmeter relay 26, the arm 39 will occupy its neutral position when the power components of the polyphase currents are properly balanced.

Since the bridge 7 balances only the power component currents in the polyphase circuits, means must be provided for balancing the wattless component currents in the polyphase circuits in order that balanced polyphase conditions may be established in the system. One method for accomplishing this purpose is to provide an auxiliary source of wattless current, here shown as a sychronous alternator 44. The alternator 44 has its terminals connected to switch blades of a two-pole, double-throw switch 45 whereby the alternator may be connected, at will, to phase 1—2 through leads 46 or to phase 3—4 through leads 47. The alternator 44 comprises a field winding 48 that is connected in circuit with an adjustable resistor 49 and a movable contact arm 50. Direct current excitation for the field winding 48 is furnished from direct current mains 51.

The movable arm 50 is mounted upon a toothed wheel 52, that, in turn, engages a worm element 53, which is rotated by a polyphase alternating current motor 54. The excitation of the motor 54 is controlled by means of a reversing switch 55 that is similar in all respects to the electromagnetic reversing switch 30. Electromagnets 56 and 57 of the reversing switch 55 are excited by a differential polyphase wattless relay 58. The relay 58 comprises an upper current carrying coil 59 that is connected in series circuit relationship with the main 1 and the current carrying coil 37 of the differential wattmeter 26, and a lower current carrying coil 60 that is connected in series circuit relationship with the main 3 and the current carrying coil 35 of the differential wattmeter relay 26. The current carrying coil 59 is associated with a voltage coil 61 that is connected across the phase 3—4 and the current carrying coil 60 is associated with a voltage coil 62 that is connected across the phase 1—2.

It will be noted, therefore, that the current coil of one phase is associated directly with a voltage coil connected across another phase of the polyphase system. When the wattless component currents obtaining in the polyphase circuits are equal, the differential wattless relay 58 will occupy its neutral position. When unbalanced wattless currents obtain in the polyphase circuits, however, the relay 58 will excite the reversing switch 55 in such manner that the polyphase motor 54 will rotate in the proper direction to supply a balancing wattless current to the proper phase in order to restore balanced conditions between the polyphase wattless component currents obtaining in the several phases of the system.

The synchronous machine 44 is designed, of course, to supply either leading wattless current or lagging wattless current to the polyphase system, depending upon the requisite conditions for restoring balanced polyphase conditions in the system.

It will be apparent that the point of inter-connecting the phase-balancing means to the polyphase system will be so selected that the system will operate under the most economical conditions. If the unbalanced loads are extended over a wide area, pilot wires may be necessary for connecting the control devices, which will probably be stationed at the power house with the phase-balancing means, at the desired points in the system in order that the phase-balancing may be effected at a point common to all of the polyphase circuits.

Figure 6:
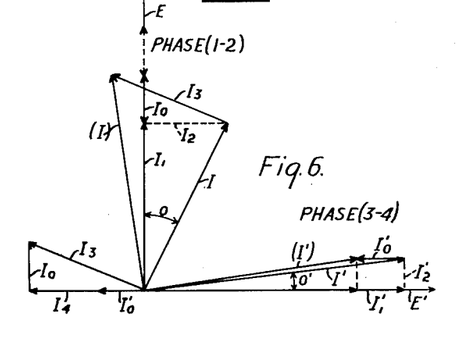

In order to understand the operation of the system shown in Fig. 1, attention may be directed to the vector diagrams of Figs. 6 and 7.

Assume that unbalanced loads are imposed upon the polyphase system of Fig. 1, as represented by current vectors I and I' of Fig. 6. The current I in phase 1—2 lags behind its voltage E by an angle O and the current I' in phase 3—4 leads its voltage E' by the angles O'. Since the power components only of the unbalanced load currents I and I' are capable of being balanced by the bridge 7, it is apparent that, in the interest of economy in operation of the system, the wattless balancing means, such as the synchronous machine 44, should be connected to that phase of the system in which the larger wattless current tends to flow by reason of the unbalanced polyphase loads. Consequently, under the aforementioned conditions, the synchronous machine 44 is connected to phase 1—2 in order to assist in restoring those balanced polyphase conditions that will be the more economical. The double-pole switch 45 is provided for this purpose whereby the machine 44 may be connected, at will, to either phase of the system.

The differential wattmeter 26 is instrumental in varying the condensive and inductive admittances of the bridge while maintaining the ratio between them constant, as mentioned above. The bridge is thus automatically adjusted until the two power components of the polyphase currents are equal. The bridge, therefore, transfers from phase 3—4 to phase 1—2 a power component current $I'_0$ that is subtracted from the power component $I'_1$ of the current I'. This transferred power component current in phase 1—2 is represented by a vector $I_0$ that is added to the power component $I_1$ of the current I.

Since the bridge balances the power components only of the unbalanced polyphase currents, the wattless components are balanced by the synchronous machine 44, which, in this instance, serves to supply a leading current to the phase 1—2. The differential wattless meter relay 58 is instrumental in exciting the field winding 49 of the machine 44 to the proper degree whereby the wattless components of the currents in both phases may be equalized. When this condition is established, balanced polyphase currents will obtain in both phases of the distributing system.

Because the wattless component current $I'_2$ of the current I' is invariable, the resultant balanced polyphase current (I') of phase 3—4, as well as, the resultant balanced polyphase current (I) of phase 1—2 should possess wattless components that are equal in value to the wattless component current $I'_2$. To obtain this condition, the current $I'_0$, which is purely a power component current, is subtracted vectorially from the current I', giving the resultant balanced polyphase current (I') in phase 3—4. At the same time, a current represented by a vector $I_3$ is vectorially added to the current I in order to procure the resulant balanced polyphase current (I) in phase 1—2.

The current $I_3$ may be resolved into two component currents, one component being $I_0$, which is the power component transferred to the phase 1—2 from the phase 3—4 through the intermediary of the bridge 7, and the other component being $I_4$, which is the wattless component of the leading current supplied to phase 1—2 by the synchronous machine 44.

In Fig. 7, the unbalanced polyphase currents I and I' indicate that the more economical operation of the system dictates that the wattless balancing means or synchronous machine 44 be connected to the phase 3—4 in order that the leading unbalanced current I' may be combined with a lagging current furnished by the synchronous machine 44 in order to secure a lagging resultant balanced polyphase current (I') therein.

In this instance, only a power component current $I_0$ of the unbalanced current I is transferred through the intermediary of the bridge 7 from phase 1—2 and added, as a power component current $I'_0$ to the phase 3—4. The wattless component $I_2$ of the current I in phase 1—2 remains invariable. The resultant balanced polyphase current in phase 1—2, therefore, may be represented by a vector (I).

In order to restore balanced polyphase conditions, a resultant current $I'_3$ must be vectorially added to the unbalanced polyphase current I' in phase 3—4. The resultant current $I'_3$ comprises a power component, which is the current $I'_0$ transferred from phase 1—2 by means of the bridge 7, and a wattless component current $I'_4$, which is the wattless component of the lagging current supplied to phase 3—4 by the machine 44.

Figure 2:
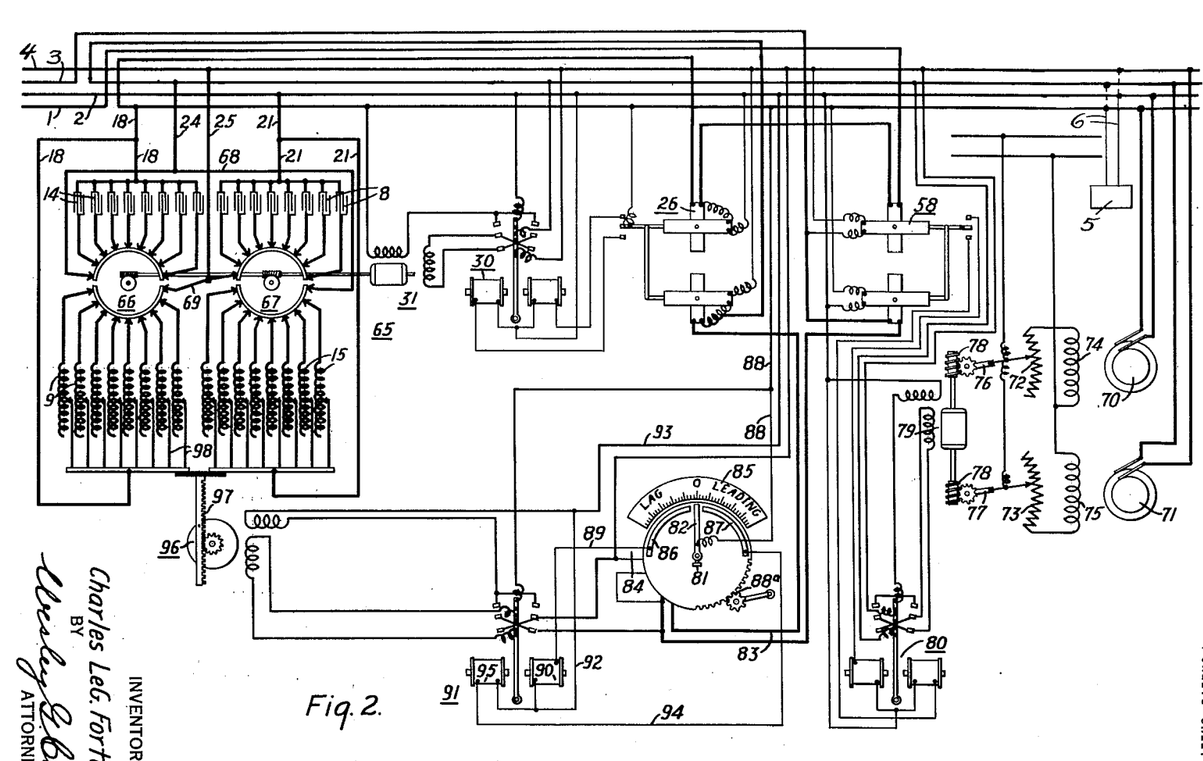
Fig. 2 is a diagrammatic view of a modified form of the system illustrated in Fig. 1.

In the system shown in Fig. 2, means are provided for proportionately varying the admittances of the bridge arms as well as varying the ratio between the condensive admittance and the inductive admittance of the bridge. It is, therefore, obvious, as mentioned above, that the power factors of the polyphase circuits may be controlled in any predetermined manner, after balanced polyphase conditions have been restored in the system. While the bridge of this system automatically balances the power components of the polyphase currents, auxiliary means are supplied for balancing the wattless components of the polyphase currents.

After the component polyphase currents have been balanced the ratio between the condensive and inductive admittances of the bridge may be varied in order to simultaneously control the power factors of the resultant balanced polyphase currents.

The phase balancing means of this system, embodies a bridge 65 that comprises the group of parallel connected condensive elements 14 and the group of adjustable inductive elements 9 that are associated with a control drum 66. The main 1 is connected through the leads 18 to the group of condensive elements 14 and the group of inductive elements 9. The group of condensive elements 8 and the group of adjustable inductive elements 15 are associated with a second control drum 67, to which elements the main 2 is connected through leads 21. The condensive elements 14 are connected to the inductive elements 15 through a conductor 68 that, in turn, is connected to the main 3 by means of a lead 24. In a similar manner, the group of inductive elements 9 are connected to the group of condensive elements 8 by means of a conductor 69 that, in turn, is connected to the main 4 by means of the lead 25.

By referring to Fig. 5, the manner of interconnecting the static elements 8, 9, 14 and 15 is illustrated in a simple form. The bridge 65 is consequently somewhat similar to the bridge 7 of Fig. 1 with the exception that the reactances offered by the inductive elements 9 and 15 are capable of being automatically adjusted.

The differential wattmeter relay 26 of this system is connected in circuit in the same manner as the differential wattmeter relay 26 of the system shown in Fig. 1 and likewise controls the excitation of the electromagnetic reversing switch 30 that, in turn, controls the direction of rotation of the alternating current motor 31 to which the control drums 66 and 67 are connected.

Since the wattless components of the unbalanced polyphase currents are not balanced by means of the bridge 65, auxiliary means in the form of two synchronous machines 70 and 71 is provided to accomplish this end. The machine 70 is permanently connected to the phase 1—2 and the auxiliary machine 71 is permanently connected to the phase 3—4. The machines 70 and 71 have their field excitation so adjusted that either one may furnish a wattless leading current to its associated phase while the other one furnishes an equal wattless lagging current to its associated phase and vice versa. For instance, the machine 70 may furnish a lagging current to the phase 1—2 while the machine 71 furnishes a leading current of equal value to the phase 3—4. To this end, adjustable resistors 72 and 73 are connected in series circuit, respectively, with field windings 74 and 75 of the machines 70 and 71. An adjustable arm 76 is adapted to decrease the effective resistance of the circuit of the field winding 74 as an adjustable arm 77 is adapted to correspondingly increase the resistance of the circuit of the field winding 75 and vice versa. The arms 76 and 77 are actuated by means of worm and wheel mechanisms 78 that, in turn, are propelled by an alternating current motor 79. The direction of rotation of the motor 79 is controlled by means of an electromagnetic reversing switch 80 that is similar in all respects to the reversing switch 30. The excitation of the reversing switch 80 is controlled by means of a differential wattless current relay 58 that is similar in all respects to the differential wattless current relay 58 of Fig. 1.

Means are also provided for controlling the power factors of the balanced polyphase currents, under all load conditions. The power factors of the balanced polyphase currents may be the result of either leading currents or lagging currents or currents directly in phase with their respective polyphase voltages, depending upon the position of a rotatable dial 81 that is associated with a power factor meter (not shown) of any usual form and a conducting indicating arm 82. The power-factor meter that actuates the conducting arm 82 has its current coil connected in series circuit with mains 83 that extend from the main 3 and its voltage coils connected to leads 84 that are connected across phase 3—4 of the polyphase system.

The conducting arm 82 of the power-factor meter registers upon a scale 85 that is fixed in position and calibrated to indicate either leading power factor or lagging power factor. The dial 81 is provided with two spaced conducting segments 86 and 87 with which the conducting arm 82 is adapted to engage, under certain circumstances. When the desired power factor obtains in the polyphase circuits, the conducting arm 82 occupies a position mid-way between the conducting segments 86 and 87 and under this circumstance is out of electrical contact with them. The dial 81 may be rotated in either direction by means of the rotatable sprocket and gear mechanism 88ª. The conducting arm 82, in order to occupy a position mid-way between the conducting segments 86 and 87, must likewise rotate.

When the arm 82 engages the conducting segment 86, a circuit is established from the main 1 through a conductor 88, the conducting arm 82, the segment 86, a conductor 89, an electromagnet 90 of a reversing switch 91, leads 92 and 93 to the main 2. Similarly, when the conducting arm 82 engages the conducting segment 87, a circuit is established from the main 1 through the conductor 88, the arm 82, the conducting segment 87, a lead 94, an electromagnet 95 of the reversing switch 91, the conductors 92 and 93 to the main 2. It is obvious, therefore, that the excitation of the reversing switch 91, which is of a well known type of construction, is dependent upon whether the conducting segment 86 or the segment 87 of the dial 81 is brought into contact with the indicating arm 82 of the power-factor meter.

The reversing switch 91, in turn, controls the direction of rotation of a motor 96 that actuates a rack-and-pinion mechanism 97 upon which a plurality of adjustable leads 98 are mounted. The adjustable leads 98 are adapted to engage corresponding taps upon the inductive elements 9 and 15 of the phase balancer 65.

The power factors obtaining in the polyphase circuits are, therefore, controlled by the position of the dial 81 with respect to the indicating scale 85 of the aforementioned power-factor instrument. Through the instrumentality of the dial 81 and its coöperating elements, the values of the reactance elements 9 and 15 of the phase balancing bridge 65 may be varied whereby the ratio between the condensive and inductive admittances of the bridge is varied. As a consequence thereof, the power factors obtaining in the balanced polyphase circuits may be maintained at a predetermined value.

Figure 8:
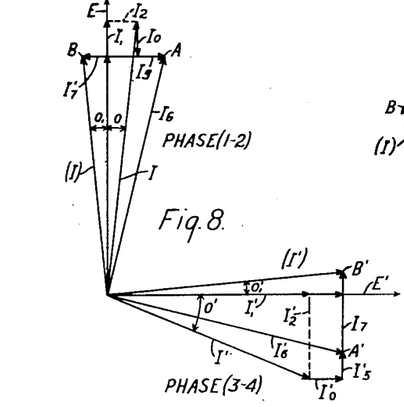
Fig. 8 is a vector diagram for illustrating the electrical conditions obtaining in the system illustrated in Fig. 2.

In the vector diagram of Fig. 8, I represents the unbalanced load current in the phase 1—2 and I' represents the unbalanced load current in the phase 3—4. For the purpose of illustration only, assume that it is desired to maintain a predetermined power factor in each phase that is occasioned by the flow of a leading current therein. In this circumstance, the power factor instrument comprising the dial 81 is manually set to the predetermined value of the power factor. Although the power-factor instrument is connected in one phase only of the system, namely phase 3—4, the indicating arm 82 indicates also the power factor obtaining in the phase 1—2, when balanced polyphase conditions are restored in the polyphase circuits.

It will be observed that both currents I and I' lag behind their respective voltages E and E'. The first step in balancing the electrical conditions may, for convenience, be the balancing of the power components of the two unbalanced polyphase load currents I and I'. Through the response of the differential watt-meter relay 26 to the unbalanced polyphase power component currents, the condensive and inductive admittances of the bridge arms are varied without destroying the ratio between them by the control drums 66 and 67 that are rotated in the proper direction by the motor 31. The power component $I_0$ is transferred from the phase 1—2, through the intermediary of the bridge 65, to add a power component $I'_0$ of equal value to the phase 3—4. In this manner the power components of the polyphase currents are equalized.

The second step is to balance the wattless components of the polyphase currents. As hereinbefore indicated, the differential wattless current relay 58 responds to the unbalanced wattless currents obtaining in the phases 1—2 and 3—4. This relay 58, in turn, controls the field excitation of the synchronous machines 70 and 71 in such manner that the wattless leading component current from one of the machines is equal in value to the wattless lagging component current from the other machine and vice versa.

Since the bridge 65 does not, in this case, affect the unbalanced wattless component currents in the polyphase circuits, the currents supplied to the polyphase circuits by the synchronous machines 70 and 71 are employed for securing balanced wattless component currents therein. Therefore, the machine 70 is excited to supply a lagging component current $I_5$ to the phase 1—2 and the machine 71 is excited to supply a leading component current $I'_5$ of equal value to the phase 3—4.

As a consequence of the two aforementioned operations, the balanced polyphase currents now obtaining in the phases 1—2 and 3—4 may be represented by vectors $I_6$ and $I'_6$, respectively. It is to be noted that these resultant currents are in balanced polyphase relationship but lag corresponding phase angles behind their respective voltages. The predetermined circuit conditions, however, require that the resultant balanced polyphase currents lead their respective voltages by equal phase angles. This angle of lead is that at which the indicating arm 82 of the power-factor instrument rotates so as to occupy an inactive position.

As mentioned above, balanced polyphase wattless currents, either leading or lagging and of any value, within limits, of course, may be supplied simultaneously to the two phases 1—2 and 3—4 by properly varying the ratio between the condensive and inductive admittances of the bridge 65. When the condensive admittance of the bridge exceeds the inductive admittance, balanced leading polyphase currents will obtain in the associated polyphase circuits.

The power-factor instrument controls the excitation of the motor 96 that, in turn, actuates the rack 97 upon which the adjustable leads 98, associated with the inductive elements 9 and 15 of the bridge, are mounted. By varying the active lengths of these inductive elements, the ratio between the condensive and inductive admittances of the bridge may be varied.

The third step, therefore, is to add equal leading currents to the phases 1—2 and 3—4. The leading wattless component current $I_7$ (vector AB) is supplied to the phase 1—2 and combines with the balanced polyphase lagging current $I_6$ to furnish the resultant balanced polyphase current (I) which leads the voltage vector E by a predetermined phase angle $O_1$. Also, the leading wattless component current $I'_7$ (vector A'B') is supplied to the phase 3—4 and combines with the balanced polyphase lagging current $I'_6$ to furnish the resultant balanced polyphase current (I') which leads the voltage vector E' by the predetermined phase angle $O'_1$ or $O_1$.

In the system shown in Figs. 1 and 2, balanced polyphase conditions were restored in the polyphase circuits by employing means, exclusive of the bridges, for balancing the wattless components of the unbalanced polyphase currents. In each of the systems, the bridge possesses a one-to-one voltage transformation, which condition necessitates that the bridge, of itself, supplies wattless component currents that are equal in value to the polyphase circuits.

Figure 3:
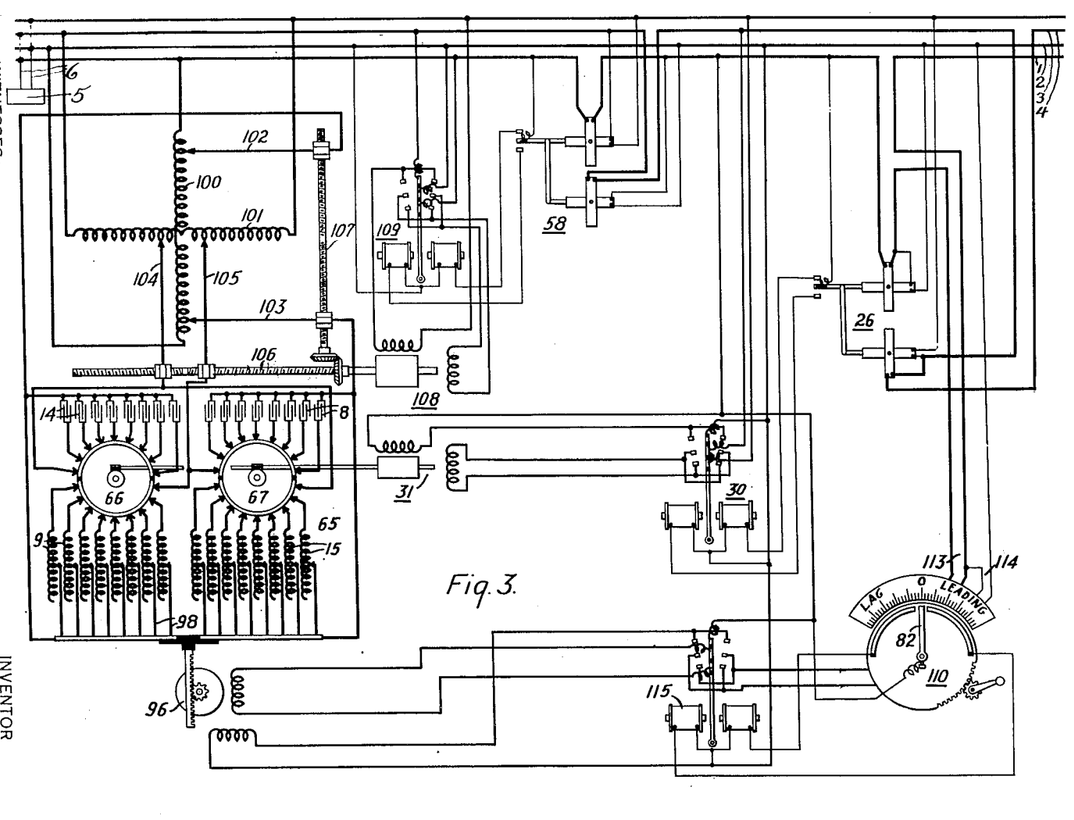
Fig. 3 is a schematic diagram showing another modification of a polyphase distributing system embodying a form of my invention.

As mentioned above, the wattless components of the unbalanced polyphase currents may be balanced through the intermediary of a bridge if means are provided for varying the voltage transformation of the bridge or for securing the electrical equivalent thereof. In this instance, the wattless components of the unbalanced polyphase currents may be balanced in a manner similar to that of the power components of the unbalanced polyphase currents. The system shown in Fig. 3 is designed to accomplish this end.

An adjustable auto-transformer winding 100 is connected across phase 1—2 and a second adjustable auto-transformer winding 101 is connected across phase 3—4. Two adjustable leads 102 and 103 are provided for varying the active length of the transformer winding 100. The leads 102 and 103 correspond respectively to the leads 18 and 21 of the bridge 65 of Fig. 2. Adjustable leads 104 and 105 are adapted for varying the active length of the primary portion of the auto-transformer winding 101 and correspond respectively to leads 24 and 25 of the bridge 65 of Fig. 2. The leads 104 and 105 are mounted upon a threaded shaft 106 which is so designed as to permit these adjustable leads to travel corresponding distances in opposite directions. Likewise, the leads 102 and 103 are mounted upon a threaded shaft 107 which is so designed as to permit the leads to move corresponding distances in opposite directions. Again, the leads 102 and 103 vary the active length of the primary portion of the auto-transformer winding 100 inversely and directly proportional to the active length of the primary portion of the auto-transformer winding 101.

By thus varying the taps upon the two auto-transformer windings, the voltages impressed upon the phases 1—2 and 3—4 of the polyphase system may be varied in any desired degree. By reason of this variation of the voltages impressed upon the two phases by the phase balancing bridge 65, the wattless components of the unbalanced polyphase currents may be balanced in the same manner as the power components of the unbalanced polyphase currents.

The differential wattless current relay 58 is adapted for controlling the direction of rotation of a motor 108 that, in turn, rotates the threaded shafts 106 and 107. The motor 108 is properly energized through a reversing switch 109, the selective excitation of which is controlled directly by the differential wattless current relay 58.

The admittances of the bridge arms are proportionately varied by the motor 31 which is rotated in the proper direction by means of the reversing switch 30 that, in turn, is actuated by the differential wattmeter relay 26.

In order to control the power-factors obtaining in the polyphase circuits, a power factor-instrument 110 is employed. The instrument 110 is similar in all respects to the power-factor instrument employed in the system of Fig. 2, and is connected to the phase 1—2 by current leads 113 and voltage leads 114.

The ratio between the condensive and inductive admittances of the bridge 65 is varied by means of the motor 96 which adjusts the leads 98, as hereinbefore mentioned.

Figure 9:
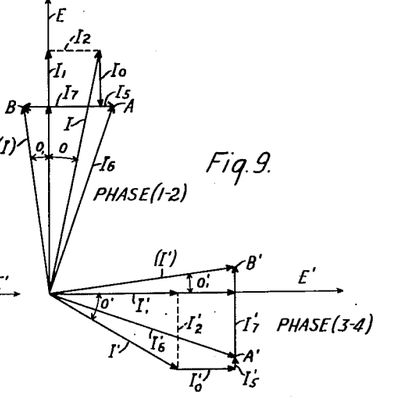
Fig. 9 is a vector diagram for illustrating the electrical conditions obtaining in the system illustrated in Fig. 3.

The vector diagram of Fig. 9 illustrates the electrical conditions obtaining in the polyphase system when the bridge 65, of itself, serves as a phase balancer to balance both the wattless and power components of the unbalanced polyphase currents. The vector I indicates the unbalanced load current obtaining in phase 1—2 and the vector I' the unbalanced load current obtaining in phase 3—4. For the purpose of illustration, assume that it is desired to maintain balanced polyphase leading currents in the polyphase circuits. It will be noted that the currents I and I' are lagging currents. Therefore, the problem consists in supplying balanced polyphase leading currents, in addition to balancing both the wattless and power components of the polyphase load currents I and I'.

The differential wattmeter relay 26, by reason of its response to the polyphase power component currents, serves through the motor 31 and the control drums 66 and 67 to vary the condensive and inductive admittances of the bridge without varying the ratio between them. In this manner, the power components of the unbalanced polyphase currents I and I' are equalized. A power component current $I_0$ is transferred from phase 1—2 through the intermediary of the bridge 65 to phase 3—4. This transferred power component $I'_0$, therefore, is vectorially added to the current I'.

Figure 4:
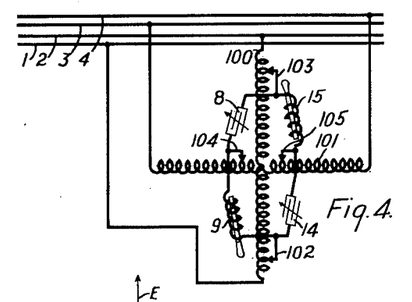
Fig. 4 is a diagram for illustrating in a simplified manner a portion of the phase balancing means embodied in the system of Fig. 3.

It has been hereinbefore mentioned that the wattless component currents in the polyphase circuits may be balanced by varying the voltage transformation of the bridge or by varying the voltages impressed upon the polyphase circuits by the bridge in inverse proportion to each other. To this end, the adjustable auto-transformer winding 100 is connected across one diagonal of the bridge, as shown in the simplified diagram of Fig. 4 and the adjustable transformer winding 101 is connected across the other diagonal of the bridge. Moreover, the mechanism comprising the adjustable leads 102, 103, 104 and 105 provides means whereby the active length of the transformer winding 100 may be varied in inverse proportion to the active length of the transformer winding 101, and vice versa.

The differential wattless current relay 58 which responds to the wattless component currents in the polyphase circuits controls the motor 108 which, in turn, actuates the mechanism for varying, in the proper degree and relation, the active lengths of the transformer windings 100 and 101 whereby the wattless component currents in the polyphase circuits may be balanced. As a consequence, the unbalanced wattless component current $I'_5$ is transferred from the phase 3—4 to the phase 1—2, by reason of the adjustments effected to vary the voltage transformation of the bridge. This transferred wattless component current $I_5$ is vectorially added to the current I. The balanced polyphase currents $I_6$ and $I'_6$ are, however, lagging currents.

In order to secure leading resultant balanced polyphase currents, as mentioned above, leading balanced wattless component currents must be supplied to the polyphase circuits. To this end, the power-factor meter 110 is provided. Having set the indicating arm 82 of this instrument at the predetermined power factor, the motor 96 remains excited through the circuits established by a reversing switch 115 until equal power factors of the predetermined value obtain in the polyphase circuit. The motor 96 varies the reactance of the inductive elements 9 and 15 of the bridge 65 whereby the ratio between the inductive and condensive admittances of the bridge is varied.

By varying this ratio, equal wattless currents, leading or lagging, may be supplied to the polyphase circuits; in this instance, leading wattless currents. Therefore, a leading wattless component current $I_7'$ (vector A'B') is supplied to phase 3—4 and an equal leading wattless component current $I_7$ (vector AB) is supplied to phase 1—2. The resultant balanced polyphase currents (I) and (I') are consequently leading currents that are advanced equal phase angles $O_1$ and $O_1'$ ahead of their respective voltages E and E'.

From the foregoing descriptions of the systems shown in Figs. 1, 2 and 3, it will be apparent that when the polyphase voltages, which are impressed upon the polyphase circuits, are severally offered equal and electrically symmetrical admittances, the polyphase system operates under balanced conditions, irrespective of the manner of disposing the loads upon the system. The bridge, comprising the adjustable condensive and inductive elements, in combination with the transformer windings 100 and 101 of Fig. 3, or the synchronous machines 70 and 71 of Fig. 2, or the equivalents thereof, is instrumental in arranging the admittances of the several polyphase circuits in such manner that balanced polyphase conditions may be restored.

It is obvious, of course, that the foregoing adjustments, effected with reference to the bridge 65 and, where employed, the auxiliary devices working in conjunction with the bridge 65 to restore balanced polyphase conditions in the polyphase system, are made simultaneously and are continued until the desired electrical conditions severally controlling the adjusting mechanisms are restored.

While I have shown and described several embodiments of my invention, it will be understood that many modifications may be made therein without departing from the spirit and scope of the appended claims.

I claim as my invention:

1. In a system of transmission comprising polyphase circuits, a phase balancer comprising a group of adjustable elements, two possessing condensive characteristics and two possessing inductive characteristics, said condensive elements alternating in position with the inductive elements to form a closed circuit, means for adjusting said elements to balance the power component polyphase currents, and means for effecting the flow of balanced wattless currents in the polyphase circuits in order to control the power factors of the balanced polyphase currents.

2. In a system of transmission comprising polyphase circuits, a phase balancer comprising a group of adjustable elements, two possessing condensive characterictics and two possessing inductive characteristics, said condensive elements alternating in position with the inductive elements to form a closed circuit, means for adjusting the admittances of said elements in order to balance the power component polyphase currents, and means for varying the ratio between the condensive and inductive admittance of the phase balancer in order to effect the flow of balanced wattless currents in the polyphase circuits.

3. In a system of transmission comprising polyphase circuits, a phase balancer comprising a group of adjustable elements, two possessing condensive characteristics and two possessing inductive characteristics, said condensive elements alternating in position with the inductive elements to form a closed circuit, means for adjusting said elements to balance the power component polyphase currents, means for balancing the wattless component polyphase currents, and means for effecting the flow of balanced wattless currents in the polyphase circuits in order to control the power factors of the balanced polyphase currents.

4. In a system of transmission comprising polyphase circuits, a phase balancer comprising a group of adjustable elements, two possessing condensive characteristics and two possessing inductive characteristics, said condensive elements alternating in position with the inductive elements to form a closed circuit, means for proportionately varying the admittances of said elements in order to balance the power component currents obtaining in the polyphase circuits, and means for balancing the wattless component currents obtaining in the polyphase circuits.

5. In a system of transmission comprising polyphase circuits, a phase balancer comprising a group of adjustable elements, two possessing condensive characteristics and two possessing inductive characteristics, said condensive elements alternating in position with the inductive elements to form a closed circuit, means for proportionately varying the admittances of said elements in order to balance the power component currents obtaining in the polyphase circuits, and means for balancing, through the intermediary of the phase balancer, the wattless component currents obtaining in the polyphase circuits.

6. In a system of transmission comprising polyphase circuits, a phase balancer comprising a group of adjustable elements, two possessing condensive characteristics and two possessing inductive characteristics, said condensive elements alternating in position with said inductive elements to form a closed circuit, means for proportionately varying the admittances of said elements in order to balance the power component currents obtaining in the polyphase circuits, and means for varying the ratio between the condensive and the inductive admittance of the phase balancer in order to effect the flow of balanced wattless polyphase currents in the polyphase circuits.

7. In a system of transmission comprising polyphase circuits, a phase balancer comprising a group of adjustable elements, two possessing condensive characteristics and two possessing inductive characteristics, said condensive elements alternating in position with the inductive elements to form a closed circuit, means for proportionately varying the admittances of said elements in order to balance the power component currents obtaining in the polyphase circuits, means for balancing, through the intermediary of the phase balancer, the wattless component currents obtaining in the polyphase circuits, and means for varying the ratio between the condensive and inductive admittance of the phase balancer in order to effect the flow of balanced wattless currents in the polyphase circuits.

8. In a system of transmission comprising polyphase circuits, a phase balancer comprising a group of adjustable elements, two possessing condensive characteristics and two possessing inductive characteristics, said condensive elements alternating in position with the inductive elements to form a closed circuit, automatic means operative by reason of unbalanced power component polyphase currents for proportionately varying the admittances of the condensive and inductive elements in order to restore balanced power component currents in the polyphase circuits, and means operative by reason of unbalanced wattless component polyphase currents in order to restore balanced wattless component currents in the polyphase circuits.

9. In a system of transmission comprising polyphase circuits, a phase balancer comprising a group of adjustable elements, two possessing condensive characteristics and two possessing inductive characteristics, said condensive elements alternating in position with the inductive elements to form a closed circuit, automatic means operative by reason of unbalanced power component polyphase currents for proportionately varying the admittances of the condensive and inductive elements, and means operative by reason of unbalanced wattless component polyphase currents for varying the ratio of transformation of said phase balancer thereby restoring balanced polyphase conditions in the polyphase circuits.

10. In a system of transmission comprising polyphase circuits, a phase balancer comprising a group of adjustable elements, two possessing condensive characteristics and two possessing inductive characteristics, said condensive elements alternating in position with the inductive elements to form a closed circuit, automatic means operative by reason of unbalanced power component currents for proportionately varying the admittances of the condensive and inductive elements in order to restore balanced power component currents in the polyphase circuits, and means operative by reason of unbalanced wattless component currents for balancing, through the intermediary of said phase balancer, the unbalanced wattless component currents obtaining in the polyphase circuits.

11. In a system of transmission comprising polyphase circuits, a phase balancer comprising a group of adjustable elements, two possessing condensive characteristics and two possessing inductive characteristics, said condensive elements alternating in position with the inductive elements to form a closed circuit, means operative by reason of unbalanced power component currents for proportionately varying the admittances of the condensive and inductive elements in order to restore balanced power component currents in the polyphase circuits, automatic means operative by reason of unbalanced wattless component currents for balancing, through the intermediary of said phase balancer, the unbalanced wattless component currents obtaining in the polyphase circuits, and means for varying the ratio between the condensive and inductive admittance of the phase balancer in order to regulate the power factors of the balanced polyphase currents.

12. A system of transmission comprising polyphase circuits, a phase balancer comprising a group of adjustable elements, two possessing condensive characteristics and two possessing inductive characteristics, said condensive elements alternating in position with the inductive elements to form a closed circuit, means operative by reason of unbalanced power component currents for proportionately varying the admittances of the condensive and inductive elements in order to restore balanced power component currents in the polyphase circuits, means operative by reason of unbalanced wattless component currents for varying the voltage ratios of the respective phases of said balancer in order to restore balanced wattless component currents in the polyphase circuits, and means responsive to the power factor obtaining in the polyphase circuits for varying the ratio between the condensive and inductive admittance of the phase balancer.

In testimony whereof, I have hereunto subscribed my name this 27th day of April, 1917.

CHARLES LE G. FORTESCUE.